United States Patent Office 3,330,186
Patented July 11, 1967

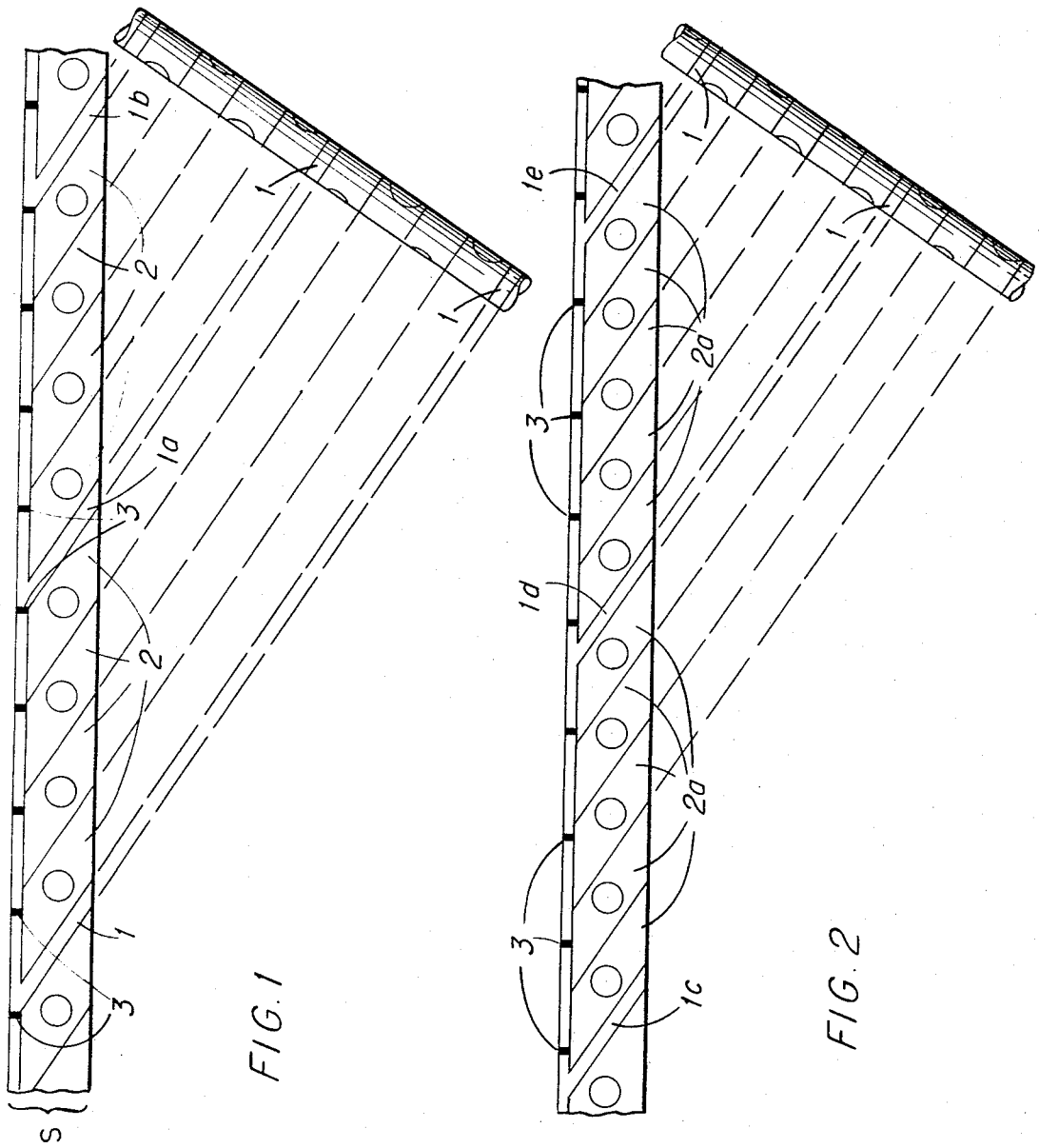

3,330,186
LAYOUT OF CONTROL FEATURE ON PATTERNED
STRIP FOR HELICALLY WOUND CONTAINERS
Francis G. Glasby and Ernest B. Robinson, Chesterfield,
England; said Glasby assignor to Robinson & Sons Ltd.,
Chesterfield, England, a British company
Filed Aug. 16, 1966, Ser. No. 572,701
4 Claims. (Cl. 93—80)

This invention relates to the layout of patterned strips in preparation for helically winding the same onto continuously formed spiral tubes in the course of making fibre-bodied containers having unitary patterns or labels thereon in register with the container ends.

More particularly, the invention concerns a method of laying out control features on the patterned strip in a way which will give more latitude in controlling the mechanisms, the operation of which is under control of the control features for the purpose of regulating and determining the cutter position on cutting up to the tube into container bodies.

It is well known for unitary patterns on strip material to be applied helically on continuously wound tubes in the manufacture of tubular containers. Three typical examples are found in prior patents Nos. Re. 23,899; 2,737,091 and 3,264,956, hereinafter referred to as "planned trim," "hidden trim" and "hybrid trim."

In the prior art, control features are provided on the patterned strip for cooperation with registering apparatus or detectors, including selector switches, for controlling the operation of the cutters so as to obtain register of the cutters with the patterns. The control could be direct, i.e. it could cause the cutters to cut; or it could be indirect, i.e. it could regulate the position of the cutters relative to the patterns on the tubing that was to be cut up.

The present invention is of importance where machines, used for producing lengths of such patterned tube and/or container bodies, are of the "continuous" type, such as in Patent 2,623,443 wherein the part of the machine which performs the cutting operation reciprocates in continuous manner. Such machines when used for the production of sticks and container bodies have mechanisms to adjust, automatically, the position of the cutters relative to the patterns when error develops in the relative positioning of a control feature and the cutters.

In practical application of the "planned trim" method, surplus space material must be provided at the end of every stick whether the stick is cut up into container bodies simultaneously with the cutting-off of the stick from the being-formed tubing, or whether the stick is cut off as a unit and carried to a recuter to be cut into individual container bodies. This surplus space material is provided to take into account expected winding errors that accumulate as the number of container bodies which constitute the length of the stick are wound.

The printing of a patterned strip is most commonly done by a rotary printing cylinder on which is laid out the number of patterns for the individual container bodies and the surplus space material.

It is obvious that the circumference of the printing cylinder must contain a whole number of container body patterns plus the surplus space material, with no part of the circumference left over and without a fraction of a pattern left over. If this requirement is not scrupulously observed, the patterns will not match to form identical, properly registered labels on the container bodies as the strip is wound. Moreover, since there must be surplus space material in the form of a trim band at the end of each stick, there will have to be a trim band included in the circumference of the printing cylinder.

In practice of the planned trim method, it is essential for each stick cut off to contain a whole number of pattern groups with their trim bands included. In other words, if there is a group of four patterns plus a band of surplus space material on the cylinder circumference and if the stick length is to contain the printing from two cylinder revolutions, then eight patterns and two space material bands would be contained in each stick.

If this condition is not observed, the next stick will have a trim band located at an odd place along the stick wherein the cutters would cause it to become part of a container body, thus throwing the whole operation immediately out of coordination. And that is only one of the resulting difficulties that would ensue.

In addition to the foregoing, in the "planned trim" method, the control features which were provided on the patterned strip for the purpose of giving indications or signals to registering apparatus (and which often but not always were in the trim space) always occurred at intervals corresponding to the frequency of the trim bands.

Put another way, there would be only one control feature (regardless where it was placed) for each series of patterns and its surplus trim space.

This factor perforce restricted the frequency of operation of the registering apparatus to that of the occurrence of such trim bands. Thus, in the above example where the stick contained eight patterns and two trim bands, it was possible to make, at most, only two registration observations.

In the "hybrid trim" of Patent 3,264,956, the control features would occur at the same intervals as the pattern sequences, as in "planned trim"; and thus would restrict the frequency of operation of the registering apparatus just as in "planned trim."

Thus, in both the "planned trim" and "hybrid trim," the control feature had a constant relationship to a pattern sequence including its trim space.

The object of the present invention is to make provision for proper location of more than one control feature in a sequence consisting of a series of patterns plus a surplus trim band (as occurs in practice of the "planned trim" method) or consisting of a series of patterns plus a periodic trim band (as in practice of the "hybrid trim" method) wherein the control features may cooperate successively or in predetermined order with known mechanisms so as to adjust, to a desired position, the cutting means relative to the patterns in order that the cutting off of sticks or the cutting up of sticks into container bodies will be in register with the patterns.

A related object is to provide for proper spacing and location of control features on the printing cylinder so that they will appear in properly located and properly spaced positions on a printed strip of the type which contains successive sequences, each of which includes a series of patterns and a band of surplus space material.

Two examples of pattern strips with control features according to this invention are diagrammatically illustrated in the two figures of the accompanying drawing. Each figure shows the strip in plan and, in projection, a wound tube.

Referring to FIG. 1, a continuous length of strip material S is shown. The strip, as printed by a rotary printing cylinder as is usual, will have the imprint of the cylinder repeated along it. Assuming, therefore, that each printing cylinder circumference will have one trim band and four patterns laid out in conventional fashion upon it, these will appear on the strip in repeated sequences, each sequence consisting of a trim band 1 and four patterns 2, as in the illustration of FIG. 1.

Carrying on the example, it will also be assumed that it is desired to cut off from a continuous tube on which the strip is spirally wound, a stick for subsequent recutting containing eight container bodies. Then there will be along the stick a half trim band, four patterns, then a whole trim band and four more patterns followed by another half trim band. These two half bands are removed when the stick is cut up into container bodies on a recutter.

For gang cutting on the winding machine, the cut would be made so that a whole trim band will appear at the leading end of the tube as viewed at the moment the cut is to take place.

As is well known by those familiar with the art and with the operation of "continuous" winding machines (as in Patent 2,623,443), the cutter carriage reciprocates alongside of the being-formed tube and is moved radially toward and away from the tube to make the cut. The cutter is kept in register with the patterns by mechanism which operates automatically to make corrections or adjustments whenever the cutting error gets beyond a predetermined amount determined by commercial tolerance. The control feature on the patterned strip is observed by a device, usually an electric eye, to tell the adjusting mechanism when to correct and in which direction.

Obviously, frequent observations and corrective adjustments will hold to a minimum the misregister of the cutters and patterns by initiating early adjustment to compensate for register error. Moreover, since the machine cannot make an instantaneous correction, but must respond mechanically (even though the observation is instantaneous), it is desirable to keep at all times the cutters and patterns as near as possible to exact register.

In the example of FIG. 1, it was heretofore possible to make a corrective adjustment only twice, at most, in a stick of eight container lengths because of the presence of only one control feature for each printing cylinder circumference; or, stated alternatively, there was one control feature for each four-pattern series.

If it be assumed that the smallest degree of misregister which the machine would observe and start to correct occurred as the fifth pattern passed the observation point, then three more patterns had to pass with cumulatively increased misregister, before another control feature would reach the observation point and be in position to initiate the corrective adjustment. Obviously, the larger the number of patterns per printing cylinder, the more patterns would have to pass the observation point before the misregister could be detected.

Actually, it was the circumference of the printing cylinder that determined the minimum distance the patterned strip had to travel before a needed correction could be observed, there being one pattern sequence per cylinder circumference and that sequence having to fill the circumference completely. If only two patterns and space material in the sequence could be fitted on the printing cylinder in the case of large containers, the distance the strip would have to travel would still equal the cylinder circumference, i.e. the pattern sequence.

According to the present invention, a plurality of control features are placed, preferably, along the underlap, i.e. the one edge of the strip which is overlaid by the edge of the other edge of the strip in the succeeding convolution of the winding. The multiple control features must be spaced an exact division of the length of a pattern sequence both in the case of "planned trim" and "hybrid trim"; in other words, in practice, an exact division of the circumference of the printing cylinder.

This will result in the control marks being dissimilarly positioned with relation to the patterns. The relationship will vary from one pattern to the next one with which a control feature is juxta-positioned. This may be observed in FIG. 1 wherein there are four control features 3, between trim bands 1 and 1a and between 1a and 1b, and eight along the stick. No one control feature has the same relative position to its juxta-positioned pattern as any other in any pattern sequence.

Similarly, in FIG. 2 there are five patterns 2a between succeeding trim bands 1c and 1d and likewise between 1d and 1e and ten along the stick. But no control feature has the same relative position of its pattern as any other in any pattern sequence.

It should be noted also that no control feature is located in the trim band, as that is not necessary. However, one control feature of each series could lie in the area at the head of the trim band, if desired, provided that the number and spacing are as above described.

Inasmuch as the mechanism for comparing the position of the control feature with the position of the cutters is known, and one form is described in Patent 2,623,443, while a number of other forms are in daily use, a detailed description of these is unnecessary.

Obviously, however, if the comparison between the control feature and the cutter position was made heretofore by said mechanism only once for the passage of four patterns or five patterns, the gearing or other means will have to be altered so that the comparison can be made as frequently as the frequence of passage of the control features, this alteration being merely routine for a technician in the art.

Although the drawing and description refer to a stick having eight patterns in two pattern sequences, each having four patterns and trim space, and ten patterns in two pattern sequences, each having five patterns and trim space, with the sticks in both cases having eight control features, it will be understood that the invention is not limited to a particular number of containers or a particular number of pattern sequences in a stick, nor to a particular number of control features per stick or per pattern sequence. It is essential that the control features be spaced apart from one another at an exact division of the length of the pattern sequence, i.e. a series of patterns and trim space, whether the trim space be a trim band as in "planned trim" or periodic bands as in "hybrid trim."

To achieve the objective of this invention, more than one control feature must be allotted per pattern sequence.

If the wound stick results from only one pattern sequence, there is no mathematical limitation on the maximum number of control features per stick. The only upper limit on the number is what is mechanically practical.

Normally the wound stick will consist of at least two pattern sequences.

If it consists of two, then the number of control features per stick is double the number appearing in a pattern sequence. If three, treble the number and so on. Thus, one cannot plan to have eight control features on a stick resulting from three cylinder circumstances, but nine are possible. Likewise, there can be ten control features if the stick results from five cylinder circumferences, but not eleven, twelve, etc.

From the foregoing, it will be apparent that the invention provides a layout on a pattern strip of a plurality of control features with relation to a pattern sequence, but without constant relationship of each control feature to consecutive patterns whereby more frequent detection of errors of cutting register is possible, the quality of the register in the products produced is improved and the amount of "trim" is minimized at the same time.

What is claimed is:

1. A patterned strip for helical winding on continuously formed cylindrical tubing by a continuous type helical winding machine that has cutting means for cutting predetermined lengths of the formed tubing, and means for making corrective adjustments of the position of the cutting means relative to the position of the being-formed patterned tubing by observation of control features on the patterned strip as they pass a certain point, said strip comprising a pattern sequence which includes a plurality of patterns and a trim band, and a plurality of control features on the strip associated with each sequence, said control features being spaced at intervals which are exact whole-number subdivisions of the pattern sequence length.

2. A patterned strip for helical winding on continuously formed cylindrical tubing by a continuous type helical winding machine that has cutting means for cutting predetermined lengths of the formed tubing, and means for making corrective adjustments of the position of the cutting means relative to the position of the being-formed patterned tubing by observation of control features on the patterned strip as they pass a certain point, said strip comprising a pattern sequence which results from a single revolution of a cylindrical printing cylinder and which includes a plurality of patterns and a trim band, and a plurality of control features on the strip, said control features being spaced at intervals which are exact whole-number subdivisions of the circumference of the printing cylinder.

3. The method of laying out a patterned strip for helical winding on continuously formed cylindrical tubing by a continuous type helical winding machine that has cutting means for cutting predetermined lengths of the formed tubing, and means for making corrective adjustments of the position of the cutting means relative to the position of the being-formed patterned tubing by observation of control features on the patterned strip as they pass a certain point, comprising the steps of laying out on the circumference of a printing cylinder a pattern sequence that includes a plurality of patterns and a trim band to exactly fill said circumference, limiting the sequence so that when wound on being-formed tubing one or a whole number more than one of said sequences will constitute exactly said desired predetermined length, and inserting into said sequence a plurality of control features spaced apart at intervals that are exact whole-number subdivisions of said circumference.

4. The method of producing tubular container bodies with patterns in register with the ends thereof comprising helically winding into tubing a plurality of strips of material one of which has repeated pattern sequences thereon with each sequence including a plurality of patterns and a trim band and control features, said control features being spaced apart along each sequence a distance which is an exact whole-number subdivision of the length of said sequence; observing said control features as they pass a certain point; continuously cutting off predetermined lengths of the being-formed tubing, each such length containing one or more pattern sequences; ascertaining the relationship betwen the cutter and the sequences at the occurrence of each observation of a control feature; and automatically adjusting on the basis of such observations the cutter-sequence relationship when necessary.

References Cited

UNITED STATES PATENTS 2,623,443    12/1952    Robinson _____ 93—80
3,133,483    5/1964    Glasby _____ 93—80

BERNARD STICKNEY, *Primary Examiner.*

Disclaimer 3,330,186.—*Francis G. Glasby* and *Ernest B. Robinson*, Chesterfield, England. LAYOUT OF CONTROL FEATURE ON PATTERNED STRIP FOR HELICALLY WOUND CONTAINERS. Patent dated July 11, 1967. Disclaimer filed Dec. 30, 1968, by the assignee, *Robinson & Sons Ltd.*

Hereby enters this disclaimer to all the claims of said patent.

[*Official Gazette April 29, 1969.*]